United States Patent
Bonsignore

[15] 3,653,950
[45] Apr. 4, 1972

[54] HIGH IMPACT RESISTANT THERMOPLASTIC SUBSTRATE COATED WITH NON-EMBRITTLING PAINT SYSTEM

[72] Inventor: Patrick V. Bonsignore, Levittown, Pa.

[73] Assignee: Rohm and Haas Company, Philadelphia, Pa.

[22] Filed: Apr. 22, 1970

[21] Appl. No.: 30,967

[52] U.S. Cl. ............... 117/72, 117/138.8 UA, 117/138.8 D, 117/138.8 F, 117/145, 117/161 KP
[51] Int. Cl. ............................................................B32b 27/40
[58] Field of Search ............. 117/161 KP, 138.8 D, 138.8 A, 117/138.8 UA, 72, 76 F

[56] References Cited

UNITED STATES PATENTS

| | | | |
|---|---|---|---|
| 3,069,287 | 12/1962 | Hudson | 117/138.8 A X |
| 3,445,423 | 5/1969 | Sunshine et al. | 117/138.8 UA X |
| 3,509,234 | 4/1970 | Burlant et al. | 260/859 |
| 3,480,592 | 11/1969 | Dieterich et al. | 117/161 KP |

Primary Examiner—William D. Martin
Assistant Examiner—Ralph Husack
Attorney—George Simmons, Carl A. Castellan and Philip D. Freedman

[57] ABSTRACT

Rigid sheets of high impact resistant thermoplastic polymers coated with a polyurethane elastomer exhibit improved resistance to crack propagation into the sheet substrate from brittle paint coats. The preferred urethane elastomers used to coat the impact resistant thermoplastic polymers are saturated and fully reacted polymers which are the reaction products of a diisocyanate and a polyhydroxy compound which elastomers impart microknife adhesion values to the substrate of between 0.10 and 0.28. Preferably the polyhydroxy compound is a polyhydroxy-containing polyester and the diisocyanate is an aliphatic or alicyclic diisocyanate. The preferred thermoplastic polymer consists of a block polymer comprising a block of thermoplastic polymer derived from esters of methacrylic acid joined to blocks of urethane modifier comprising the residue of the reaction of a polyhydroxy-containing polyester, an aliphatic or alicyclic diisocyanate and a glycol, the modifier terminated with a functional monomer capable of ethylenic polymerization grafting with the acrylic polymer.

8 Claims, No Drawings

HIGH IMPACT RESISTANT THERMOPLASTIC SUBSTRATE COATED WITH NON-EMBRITTLING PAINT SYSTEM

This invention relates to improved thermoplastic compositions particularly characterized by their rigid properties and ability to resist propagation of cracks from coated films into the thermoplastic compositions. More particularly the invention relates to rigid high impact resistant thermoplastic polymers coated with a polyurethane elastomer. It has been found that the coating of polyurethane elastomer acts as a non-brittling primer on high impact thermoplastic sheets. In this application the term "thermoplastic" shall include synthetic resins that may be softened by heat, and then substantially regain their original properties upon cooling. Thus the term includes thermoformable plastics which may be cross-linked to a degree as well as plastics which will flow when heated beyond a melt range.

The present invention particularly relates to improving compositions of the type disclosed in U.S. Pat. application 839,655, filed July 7, 1969, Niederhauser et al. and U.S. Pat. application 864,148, filed Oct. 6, 1969, Spilner, by coating the compositions with a polyurethane elastomer primer. These applications disclose rigid thermoplastic polymers modified by urethane or acrylic elastomers. The present invention relates to these compositions as substrates further coated with a polyurethane elastomer primer and in one embodiment comprises the substrate material coated with the polyurethane elastomer and further coated with a paint film. The compositions of the present invention are useful as articles of commerce which are made of painted high impact resistant thermoplastics. The compositions are particularly useful as signs.

It has been found that high impact acrylic sheets of the compositions disclosed in the Niederhauser et al. and Spilner Patent applications undergo drastic reductions in impact strength when painted with standard acrylic sign paints. It is thought that this reduction in impact strength is due to brittle failure of the paint film which propagates through to the sheet substrate causing a notch sensitive failure of the sheet itself. It has been found that a polyurethane elastomeric primer applied between the paint film and the high impact acrylic sheet inhibits crack propagation from the paint film into the sheet and substantially reduces loss in impact resistance of the sheet. Additionally, it has been found that the acrylic polymer substrate compositions retain their rigid tough properties and exceptional ability to withstand weathering. The compositions of the present invention, characterized by the polyurethane elastomer primer coating, exhibit good adhesion of primer to substrate, good adhesion of top paint coat to primer, retain excellent impact resistance even after being subjected to thermal forming conditions and are adaptable to the use of standard sign decorating techniques including spray painting and silk screening.

Broadly, the present invention relates to a high impact resistant thermoplastic polymer modified with a coating of polyurethane elastomer. The invention consists of an article of manufacture which comprises a high impact resistant thermoplastic polymer substrate coated with a polyurethane elastomer, which article is characterized by improved resistance to crack propagation into the substrate from brittleness of paint coatings when the articles have been painted. The compositions of this invention may be further coated with a film which may or may not contain a pigment. This film may be a paint composition. The preferred substrate thermoplastic polymer consists of a block polymer comprising the residue of the reaction of a block of thermoplastic polymer derived from esters of methacrylic acid joined to blocks of urethane modifier comprising the residue of the reaction of a polyhydroxy-containing polyester, an aliphatic or alicyclic diisocyanate and a glycol, the modifier terminated with a functional monomer capable of ethylenic polymerization grafting with the acrylic polymer. The polyurethane elastomer coatings comprise the reaction product of a diisocyanate and a polyhydroxy compound which product exhibits, on the substrate, microknife adhesion values of between 0.10 and up to 0.28. The diisocyanate is preferably an aliphatic or alicyclic diisocyanate, and the polyhydroxy compound is preferably a polyhydroxy containing polyester. The present invention also relates to a process for preparing the coated impact resistant thermoplastic polymers comprising (A) preparing a urethane modifier by reacting (1) a bis-active hydrogen compound, (2) an aliphatic or alicyclic diisocyanate, and (3) an ethylenically unsaturated monomer containing either an active hydrogen functionality or functionality capable of reacting with an active hydrogen; (B) dispersing the urethane modifier of (A) in or with a monomer system suitable for the preparation of a rigid thermoplastic polymer; (C) polymerizing the monomer system to form a rigid modified thermoplastic polymer; and (D) coating the resulting polymer with a urethane elastomer. The thermoplastic polymer compositions prepared by this process retain their impact resistance and do not become embrittled when coated with paint compositions.

The polyurethane elastomers suitable in the present invention for coating the high impact polymeric substrate are urethane elastomer resins derived from the reaction of diisocyanates and polyhydroxy compounds, preferably of the hydroxyl-containing polyester variety including the elastomers disclosed as thermoplastic polymer substrate modifiers in the Niederhauser et al. or Spilner patent applications. The preferred polyurethane elastomers are urethane elastomers which are fully reacted and fully polymerized polyurethanes dissolved in an appropriate solvent. By "fully reacted" is meant that substantially all reactive isocyanate groups have combined with complementary reactive groups and substantially no free residual isocyanate groups remain. The elastomer is preferably structured around a saturated aliphatic nucleus. This polymer type is prepared by prereacting a diisocyanate with a polyol. When the reaction is completed, i.e., no free residual isocyanate groups remain, the resultant polymer is chipped and dissolved in an appropriate solvent. Alternatively the reaction is suitably carried out in a solvent such as described elsewhere in this specification.

This described class of polyurethane elastomers is preferred because elastomers from this class impart a surprisingly high degree of impact resistance retention to the preferred substrate as will be hereinafter shown. The more preferred urethane elastomers used to coat the impact resistant thermoplastic polymers are saturated and fully reacted polymers which are the reaction products of a diisocyanate and a polyhydroxy compound which products when coated onto acrylic substrates and painted exhibit microknife adhesion values of between 0.10 and up to 0.28 and preferably between 0.18 and 0.23. Determination of these microknife adhesion values is described in detail infra. Preferably the polyhydroxy compound is a polyhydroxy-containing polyester and the diisocyanate is an aliphatic or alicyclic diisocyanate. It has been found that the preferred polyurethanes are surprisingly effective in preserving the high impact resistance properties of the preferred polyurethane-modified polyacrylic thermoplastic substrate painted with an acrylic sign paint.

Generally, the urethane elastomers suitable for coating high impact resistant substrates per the present invention are those elastomers which comprise the residue of the reaction between a compound containing at least two active hydrogen sites and an aliphatic, alicyclic or aromatic diisocyanate. Any organic polyhydroxyl compounds containing active hydrogen atoms which are reactive with NCO groups such as hydroxyl polyesters, polyhydric polyalkalyene ethers, polyhydric polythioethers and polyacetals are suitable.

Any hydroxy polyester may be used in preparing the polyurethane elastomer coatings of the present invention, such as the reaction product of a polycarboxylic acid and a polyhydric alcohol. Examples of such polycarboxylic acids which may be used in the preparation of the hydroxyl polyester are adipic acid, succinic acid, sebacic acid, suberic acid, oxalic acid, methyl adipic acid, glutaric acid, pimelic acid, azelaic acid, phthalic acid, terephthalic acid, isophthalic acid, thiodipropionic acid, maleic acid, fumaric acid, citraconic acid and itaconic acid. Examples of polyhydric alcohols which may be used for reaction with the polycarboxylic acid to form a polyester include ethylene glycol, propylene glycol, butylene glycol, neopentyl glycol, amylene glycol, hexanediol and bis-(hydroxy-methyl-cyclohexane). Of course, the hydroxyl polyester may contain urethane groups, urea groups, amide groups or chalcogen groups. Thus, instead of being a pure hydroxyl terminated polyester, the hydroxyl terminated polyester may be a hydroxyl terminated polyester amide, polyester urethane or polyetherester. Any polyester amide may be used, for example, the reaction product of a diamine or of an amino alcohol with any of the compositions set forth for preparing polyesters. Any diamine may be used to prepare the polyester amide, for example, ethylene diamine, propylene diamine or tolylene diamine. An example of an amino alcohol which can be used is β-hydroxyethylamine. Any polyester urethane may be used, for example, the reaction product of any of the above-mentioned polyesters or polyester amides with less than the stoichiometrical amount of an organic diisocyanate to produce a compound having terminal hydroxyl groups. Any of the diisocyanates set forth hereinafter may be used to prepare such compounds.

Any polyetherester may be used as the organic polyhydroxyl compound containing terminal hydroxyl groups, for example, the reaction product of an ether glycol and a polycarboxylic acid such as those mentioned above, with reference to the preparation of polyesters. Any ether glycol may be used, for example, diethylene glycol, triethylene glycol, 1,4-phenylene-bis-hydroxyethyl ether and 2,2'-diphenyl propane 4,4'-bis-hydroxyethyl ether.

Any polyhydric polyalkylene ether may be used, for example, the condensation product of an alkylene oxide with a small amount of a compound containing active hydrogen-containing groups, for example, water, ethylene glycol, propylene glycol, butylene glycol, amylene glycol, trimethylolpropane, glycerine pentaerylthritol or hexanetriol. Any alkylene oxide condensate may also be used, such as the condensates of ethylene oxide, propylene oxide or amylene oxide or mixtures thereof. The polyalkylene ethers prepared from tetrahydrofuran may be used. The polyhydric polyalkylene ethers may be prepared by any known process such as, for example, the process described by Wurtz in 1859, and in the "Encyclopedia of Chemical Technology", Volume 7, pages 257–262, published by Interscience Publishers in 1951.

Any polyhydric polythioether may be used as the polyhydroxyl compound for example, the reaction product of one of the aforementioned alkylene oxides used in the preparation of the polyhydric polyalkylene ether with a polyhydric thioether, for example, thiodiglycol, bis(3-hydroxypropyl) sulfide, bis(4-hydroxybutyl) sulfide or 1,4-(β-hydroxyethyl)phenylene dithioether.

Any polyacetal may be used as the polyhydroxyl compound, for example, the reaction product of an aldehyde with a polyhydric alcohol. Any aldehyde may be used, for example, formadehyde, paraldehyde or butyraldehyde. Any of the polyhydric alcohols mentioned above with reference to the preparation of hydroxyl polyesters may be used.

The organic polyhydroxyl compound containing active hydrogen atoms should preferably be substantially linear or only slightly branched, and have a molecular weight of at least 800 and, for best results, a molecular weight of from 1,800 to 3,000, an hydroxyl number of from 75 to 35 and an acid number below 2.

Any organic diisocyanate may be used for reaction with the organic compound containing active hydrogen atoms to produce thermoplastically processable polyurethane polymers, for example, ethylene diisocyanate, ethylidene diisocyanate, propylene diisocyanate, butylene diisocyanate, hexamethylene diisocyanate, cyclopentylene-1,3-diisocyanate, cyclohexylene-1,4-diisocyanate, cyclohexylene-1,2-diisocyanate, 2,4-tolylene diisocyanate, 2,6 tolylene diisocyanate, dimeric tolylene diisocyanate, diphenylmethane-4,4'-diisocyanate, 2,2-diphenylpropane-4,4'-diisocyanate, p-phenylene diisocyanate, m-phenylene diisocyanate, xylylene diisocyanate, naphthylene-1,4-diisocyanate, naphthylene-1,5-diisocyanate, diphenyl 4,4'-diisocyanate, azobenzene-4,4'-diisocyanate, diphenylsulphone-4,4'-diisocyanate, dichlorohexamethylene diisocyanate, furfurylidene diisocyanate and 1-chlorobenzene-2,4-diisocyanate, and any of the diisocyanates disclosed infra as suitable for forming the urethanes used to modify the preferred thermoplastic substrate. Any chain extending agent containing active hydrogen atoms which are reactive with NCO groups and having a molecular weight below 500 may in addition be used, for example ethylene glycol, propylene glycol, butylene glycol, butane-1,4-diol, butenediol, butynediol, xylylene glycol, amylene glycol, neopentyl glycol, butane-2,3-diol, 1,4-phenylene-bis(β-hydroxyethyl ether), 1,3-phenylene-bis(-hydroxyethyl ether), bis-(hydroxymethyl-cyclohexane), hexanediol, diethylene glycol and dipropylene glycol; polyamines, for example such as ethylene diamine, propylene diamine, butylene diamine, hexamethylene diamine, cyclohexylene diamine, phenylene diamine, tolylene diamine, xylylene diamine, 3,3'-dichlorobenzidene, 3,3'-dinitrobenzidene, 4,4'-methylene-bis(2-chloraniline), 3,3'-dichloro-4,4'-diphenyl diamine, 2,6-diaminopyridine and 4,4'-diaminodiphenyl methane; alkanolamines, such as ethanolamine, aminopropyl alcohol, 2,2-dimethylpropanolamine, 3-aminocyclohexyl alcohol and p-aminobenzyl alcohol; water, hydrazine, substituted hydrazines such as N,N'-dimethylhydrazine, 1,6-hexamethylene-bis-hydrazine, 1,6-hexamethylene-bis-hydrazine, carbodihydrazide, hydrazides of dicarboxylic acids and disulphonic acids such as adipic acid dihydrazide, oxalic acid dihydrazide, isophthalic acid dihydrazide, thiodipropionic acid dihydrazide, tartaric acid dihydrazide, 1,3-phenylene-disulphonic acid dihydrazide, omega-aminocaproic acid dihydrazide, gamma-hydroxybutyric acid hydrazide and bis-semicarbazide and bis-hydrazine carbonic esters of glycols, for example, of many of the glycols mentioned above.

In order to obtain a homogeneous mixture of the reaction components when the reaction components are not readily miscible, and thereby to obtain a high reaction velocity, additives such as emulsifiers, retarding agents, and stabilizers, may be introduced into the urethane reaction mixture either separately or by first dissolving them in one of the components. Pigments and dyestuffs may also be introduced into the elastomer primer coatings if desired. Catalysts are generally necessary to accelerate the rate and temperature of the reaction. The catalysts used are specific to the combination of polyol and diisocyanate used in the coating and are well known in the art.

Preferably the primer coatings of the present invention do not contain pigments. However when pigments are used in the coatings, the choice of pigmentation and level thereof has an effect on properties such as work life, flow, gloss, color stability and hiding efficiency. The pigments must be absolutely dry in order to prevent gassing and/or bubbling which will contribute to poor appearance, pinholes and permeable films.

The individual reaction components and the proportions in which they are added are chosen according to the major properties which are desired in the end product. However, it is preferred that the active hydrogen containing component is present in an amount at least sufficient to react with all of the active isocyanate groups present and particularly in an amount such that a slight excess is present. For best results, it is preferred that the active hydrogen containing compound is present in an amount such that the OH to NCO ratio is from 1.0:1 to 1.2:1.

The polyurethane elastomers may be applied to the high impact substrate by any method well known in the art such as by a solution, melt, or spray technique. The polyurethane elastomer coating may also be formed on the substrate by reacting thereon the appropriate diisocyanate and polyhydroxy compounds. When utilizing an application technique which necessitates the use of a solvent or suspending method, suitable solvents include those which are relatively stable, do not degrade the substrate composition and which are not too corrosive or obnoxious. Included among the suitable solvents are esters, ketones, amides and ethers such as dimethylformamide, dimethylacetamide, N-methyl pyrrolidone, tetrahydrofuran, ethylene glycol monoethyl ether, ethylene glycol monoethyl ether acetate, methyl ethyl ketone, and cyclohexanone. Non-solvent diluents for the elastomers are aromatic hydrocarbons and alcohols such as xylene, toluene and isopropanol. These diluents can be used in blends with the solvents listed above. The preferred solvents belong to a class which are solvents for the substrate polymer. It has been found that urethane modifiers applied from solutions selected from this class of solvents are surprisingly effective in providing good adhesion of the elastomer to the substrate and in providing exceptional retention of impact resistance to the substrate. Thus, when the substrate material is the particularly preferred substrate of the material of this invention - the modified acrylic sheets - preferred solvents for application of the polyurethane elastomer coat comprise dimethyl formamide, tetrahydrofuran, ethylene glycol monoethyl ether, ethylene glycol monoethyl ether acetate and xylene-solvent mixtures. It may be that when the solvent used to apply the polyurethane elastomer primer coat is also a solvent for the substrate material, it is particularly effective in providing adhesion between the coat and the substrate because it penetrates or bites into the substrate allowing the coating to penetrate to a degree into the substrate surface. However, it has also been found that too good adhesion of the polyurethane coat on the substrate sheet is undesirable. It has been found that coatings which exhibit particularly good adhesion are ineffective in imparting impact resistance retention to the substrate material. Thus it has been found that painted polyurethane coatings which exhibit microknife adhesion values (1/A) of between 0.10 and 0.28 are suitable coating materials in the present invention. The preferred polyurethane coatings have microknife adhesion values between 0.18 and 0.23.

The microknife adhesion test is a well known test for determining the adhesion between a coating and its substrate. The apparatus used for determining the values is an Arco Microknife supplied by the Henry A. Gardner Laboratory. The Microknife uses a 60° conical point to cut a straight line 2 inches long, through a paint film to its substrate. A motor drive insures a constant rate of cuttings. A lever arrangement carrying a beam and weight permits application of a measured variable load to the cutting point. The instrument has a movable stage operated by means of a calibrated micrometer screw. The platform holding the test panel may be moved in a direction perpendicular to the cut and several cuts made at a displacement, $d$, (mils) from each other. The load on the cutting point L is adjustable from 0 to 1,000 grams. The transverse displacement $d$ is adjustable in one mil intervals from 1 mil upward. The cutting point is made of diamond and during the cutting action the principal axis of the cone is maintained perpendicular to the cutting plane. Panels of coated substrates one-sixteenth inch in thickness are used as test specimens. The coated sections of the panels are at least 2 inches in width and the film thickness of the cutting should not vary by more than ±0.25 mils from the average.

During testing, the apparatus is maintained in an atmosphere near 77° F. and 50 percent relative humidity. The test specimen is clamped, coating upward, to the stage of the Microknife. A load L (grams) is set at a value estimated to barely cause cutting through the coating with three strokes of the cutting point at one location. The three strokes are completed, the platform holding the test panel is displaced by 15 mils and three more strokes are completed. This procedure is repeated until six locations have been cut. In the event the coating strips from the substrate the displacement between subsequent cuts is increased in stages of 5 mils until no coating strips from the substrate. The load on the cutting point is increased in steps of 50 grams until the coating is penetrated to the substrate along the entire length of a cut. The final load value $L_s$ for this penetration is recorded. The load is increased to a value $L_s + 100$ grams which is $L_A$ and cuts are made at five locations displaced from each other by $d$ (mils). The number of films between cuts which have lifted from the substrate at any position along the length of the cuts is noted. The preceding procedure is repeated using various displacements $d$ until a value is found such that one mil lower displacement causes lifting of some section of at least two films between cuts. This value is recorded as $d_A$ (mils). All of the preceding procedures are repeated on panels from the same sample until three $L_A$ and $d_A$ values have been obtained.

The three readings are converted to microknife adhesion values 1/A by the equation $$A = \frac{10 d_A}{L_A^{1/2}}$$

and the values are 1/A or $$\frac{L_A^{1/2}}{10 d_A}$$

The polyurethane elastomers of the present invention used as primer coats are effective in minimizing impact resistance loss generally in impact resistant thermoplastic polymer substrates. Suitable high impact resistant polymer substrates include polycarbonates, cellulose acetate-butyrate polymers, acrylic polymers, impact modified polyvinyl chlorides and polystyrenes and various copolymers such as acrylonitrile-butadiene-styrene copolymers. Acrylic polymers of this invention include copolymers of 50 to 100 percent methyl methacrylate containing one or more comonomers in quantaties 0 to 50 percent such as other alkyl and aryl methacrylates, alkyl and aryl acrylates, alkyl and aryl acrylamides, substituted alkyl and aryl methacrylates and acrylates such as halogen, alkoxy, alkylthio, cyanoalkyl, amino, alkylthiol esters, and other substitutions, and 0 to 10 percent of other unsaturated monomers including acrylonitrile and methacrylanitrile. styrene monomers and substituted styrene monomers, vinyl esters, vinyl ethers, vinyl amides, vinyl ketones, vinyl halides, vinylidene halides and olefins. Generally as the comonomer system chosen is softer, less is used in order to retain the rigid characteristics desired in the final substrate. The acrylic polymers include those polymers containing the units of at least 50 percent by weight of the esters of acrylic and/or methacrylic acid, preferably alkyl esters. As already pointed out, the preferred substrate materials are the modified thermoplastic polymers disclosed in the Spilner and Niederhauser et al. United States patent applications. These substrate materials are preferred because the primer coatings of this invention are here surprisingly effective in reducing impact strength loss.

The Spilner application discloses high impact acrylic sheets comprising 95.5 to 99.5 percent by weight of a rigid acrylic thermoplastic polymer, and 4.5 to 0.5 percent by weight an elastomer which is an acrylic interpolymer comprising 30 to 80 parts by weight alkyl acrylate units, wherein the alkyl group contains one to eight carbon atoms, 0 to 5 parts by weight of a polyunsaturated unit, wherein a hard phase polymer is attached to the elastomer in quantities of 10 to 50 parts by weight, comprising at least 50 percent by weight methyl methacrylate units.

The modified thermoplastic polymers of Niederhauser et al. consist of a block polymer comprising (i) a block of rigid thermoplastic polymer joined to (ii) blocks of urethane elastomer modifier comprising the residue of the reaction of (A) a bis-active hydrogen functional compound, (B) an aliphatic or alicyclic diisocyanate, and (C) an ethylenically unsaturated monomer containing a reactive hydrogen functionality or functionality capable of reacting with active hydrogen, wherein the ethylenically unsaturated monomer is reacted in the terminal portions of the urethane elastomer.

The rigid thermoplastic polymers of Niederhauser et al. include the polymers and copolymers of acrylic acid, methacrylic acid and itaconic acid and polymers and copolymers of esters and amides of the same acids. The preferred thermoplastic polymer is the addition product of (a) at least 55 percent alkyl, cycloalkyl and aryl esters of methacrylic acid where the alkyl esters form a homopolymer with a glass transition temperature, Tg, greater than 90° C.; (b) 0 to 45 percent of other ethylenically unsaturated monomers capable of polymerizing with the alkyl methacrylate, and 0 to 5 percent ethylenically unsaturated monomers chosen from the group consisting of highly polar monomers and polyethylenically unsaturated monomers. The most preferred thermoplastic polymers are the polymers of methyl methacrylate.

The group of active hydrogen functional compounds (A) of Niederhauser et al. is a recognized class of compounds. The group includes, but is not limited to polyamines, polyols, aminoalcohols, and other compounds. The functional groups providing active hydrogen functionality include, but are not limited to, hdroxyl, primary amino, secondary amino, thiol, carboxyl, urylene, amido, urethane, allophanate, and the like. The active hydrogen containing compounds used in the preparation of the elastomers used in the substrate may be used alone although it is common to use two or more to achieve the desired balance of processing characteristics and physical properties desired.

Included in group (A) are compounds and condensation polymers such as polyesters and polyethers which contain "active hydrogen" to provide for the addition of or attachment to the isocyanate nitrogens of the diisocyanate. The active hydrogen on the condensation polymers may be a terminal group or it may be located along the chain, thereby providing substantial branching. The active hydrogens provided by hydroxyl or amino groups are preferred and hydroxyl termination of the polyester or polyether is more preferred. The condensation polymers useful in the preferred substrates of this invention include polyesters, polyamides and polyester amides. The condensation polymers also include polyethers or any condensation product containing active hydrogen producing radicals. The condensation polymer is preferred to have a molecular weight of at least 500 up to about 5,000. The condensation polymers of the polyester, polyamide, and polyester amide types may be prepared by the condensation reaction of a dibasic acid with a polyol, alkynol amine or a polyamine. The term polyol generally refers to diols but small quantities of polyols containing more than two hydroxyl groups may be used to obtain branching in the condensation polymer and the urethane elastomer modifier. The condensation polymer may be obtained by reacting combinations of materials of the general classes as follows: diols (and/or other polyols) and dibasic acids; amino alcohols and dibasic acids; diols, diamines and dibasic acids; diols, amino alcohols and dibasic acids; amino alcohols, diamines and dibasic acids; amino acids, glycols and dibasic acids; amino acids, amino alcohols and dibasic acids; amino alcohols, dibasic acid and hydroxy carboxylic acids. Examples of polyols useful in preparing the above condensation polymers include trimethylolmethane, trimethylolpropane, trimethylolethane, pentaerythritol, dipentaerythritol, glycerol and substituted polyols such as monoallyl glycerol. Examples of diols included propylene glycols, dipropylene glycol, polypropylene glycol, ethylene glycol, dipropylene glycol, polypropylene glycol, ethylene glycol, diethylene glycol, polyethylene glycol, trimethylene glycol, pentamethylene glycol, hexamethylene glycol, decamethylene glycol, dodecamethylene glycol, 1,12-octadecanediol, 1,3-butylene glycol, 1,4-butylene glycol, 1,6-hexanediol, 1,4-butenediol, 1,4-butynediol, 2,2-dimethyl-1,3-propanediol, β-hydroxyethyl thioether, and the like. Mixtures of polyols may be used and mixtures of diols and polyols may be utilized. Under some circumstances, it is useful to add the polyol toward the end of the esterification reaction. Preferred diols are chosen from the group of ethylene glycol and 1,2-propylene glycol. Examples of dibasic carboxylic acids useful in preparing the condensation polymers include malonic, succinic, glutaric, adipic, beta-methyl adipic, pimelic, suberic, azelic, sebacic, undecanedioic, hexahydroterephthalic, hexahydro-orthophthalic, acetone dicarboxylic, fumaric, and the like and maleic anhydride. Polybasic acids such as trimellitic anhydride may also be used. Preferred dicarboxylic acids include adipic acid, sebacic acid and fumaric acid. Of particular preference is adipic acid.

Amino alcohols useful in preparing the condensation polymers include 5-aminopentanol, hydroxyethoxyethylamine, and the like. Preferred amino alcohols may be represented by the formula

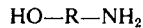
HO—R—NH₂ wherein R represents saturated divalent hydrocarbon radicals of a chain length of at least two carbon atoms. Typical amino alcohols included in this formula are ethanolamine, 3-aminopropanol, 4-aminobutynol, 6-aminohexanol, and 10-aminodecanol, and the like. Mercaptoalkanols are useful such as mercaptoethanol, 1-mercapto-4-butanol, and the like. Diamines which are useful in preparing the condensation polymers contain at least one hydrogen atom attached to each amino nitrogen atom. The preferred diamines may be represented by the formula

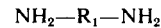
NH₂—R₁—NH₂ wherein R₁ represents saturated divalent hydrocarbon radicals of a chain length of at least two carbon atoms. Typical diamines include ethylene diamine, hexamethylene diamine, 3-methylhexyl-methylene diamine, decamethylene diamine, and the like. Poly-merizable monohydroxy, monocarboxylic acid or ester forming derivatives thereof may be employed to prepare the condensation polymers. The preferred hydroxy acids may be represented by the formula

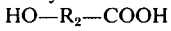
HO—R₂—COOH wherein R₂ represents saturated divalent hydrocarbon radicals. Typical hydroxy acids include 6-hydroxycaprolic, 10-hydroxydecanoic, and 12-hydroxystearic acid. Polymerizable monoamino monocarboxylic acid or ester-forming derivatives thereof may be employed to prepare the condensation polymer. These include 6-aminocaprolic, 9-aminononanoic and 12-aminostearic acids and the like. Caprolactam, caprolactone and like compounds are useful, too. Cycloaliphatic diols and triols may be used to prepare the condensation polymers described above, such as 2,2,4,4-tetramethyl-cyclobutane-1,3-diol, 1,2-cyclohexanediol and the like.

The polyethers useful in preparing the urethane elastomer of the preferred substrate may be described by the following general structure

HO(R₃O)ₙH wherein R₃ is a hydrocarbon radical and n is an integer sufficiently high to give a molecular weight of preferably from about 500 to about 5,000. The polyethers may be prepared by condensing an alkylene oxide such as ethylene oxide or propylene oxide or a mixture thereof with other alkaline oxides to provide a product having terminal hydroxide groups. Condensation products may also be prepared by condensing ethylene oxide with diols, triols, etc., such as pentanediol-1,5; 2-ethylpropanediol-1,3; 2-methylpropanediol-1,3; hexanediol; 3,4-dihydroxycyclopentane and its polyethers; alpha-alpha'-diols; trimethylolpropane; hexanetriols, and other triols.

Of particular preference is the condensation polymer of ethylene and propylene glycols and adipic acid because of its outstanding weather resistance and ease of manufacture. It is preferred that the polyadipate be hydroxyl terminated and that the ethylene glycol to propylene glycol ratio vary from 90:10 to 10:90. The preferred molecular weight of this particular polyester is 1,000 – 3,000.

The polyols used in the preparation of the urethane elastomers of the substrate increase the incidence of the urethane group along the polymer chain. This increase affects the refractive index of the urethane elastomers and may allow a closer match with the rigid thermoplastic polymer. Further, the inclusion of a polyol or mixture of polyols allows close control of the compatibility of the urethane elastomer in the liquid monomeric system before polymerization of the rigid thermoplastic polymer. Further, the introduction of the optional polyol may provide additional sites along the chain for branching, or the introduction of an isocyanate functionality for later reaction with a compound capable of grating.

The polyols of the group (A) of the substrates disclosed by Niederhauser et al. include, but are not limited to, the polyols mentioned earlier as reactants to form condensation polymers. Preferred diols contain two to 10 carbon atoms and include 1,3-butanediol, 1,4-butanediol, thioethylene glycol 1.0:0.5. and neopentyl glycol. Useful polyols containing more than two hydroxyl groups include glycerol, trimethylolpropane, pentaerythritol and the like. The equivalent ratio between a mixture of polyols and other active hydrogen functional compounds preferably varies from 0.1:0.9 to 0.9:0.1, and more preferably varies from 0.5:1.0 to 1.0:0.5. A mixture of diols and a saturated polyester is the preferred choice for group (A).

The group (B) aliphatic or alicyclic diisocyanates of Niederhauser et al. may be saturated or unsaturated. These aliphatic or alicyclic diisocyanates yield elastomers which impart good ultraviolet light and outdoor weather resistance to the resulting polymers. Saturated are more preferred than unsaturated diisocyanates. Any organic diisocyanate may be used to prepare the urethanes used as modifiers in the substrate. Examples of useful diisocyanates in this invention include ethylene diisocyanate, ethylidene diisocyanate, propylene diisocyanate, butylene diisocyanate, hexamethylene diisocyanate, cyclopentylene-1,3-diisocyanate, cyclohexylene-1,3-diisocyanate, cyclohexylene-1,2-diisocyanate, 2,4-tolylene diisocyanate, 2,6 tolylene diisocyanate, dimeric tolylene diisocyanate, diphenylmethane-4,4'-diisocyanate, 2,2-diphenylpropane-4,4'-diisocyanate, p-phenylene diisocyanate, m-phenylene diisocyanate, xylylene diisocyanate, naphthylene-1,4-diisocyanate, naphthylene 1,5-diisocyanate, diphenyl 4,4'-diisocyanate, azobenzene-4,4'-diisocyanate, diphenylsulphone-4,4'-diisocyanate, dichlorohexamethylene diisocyanate, furfurylidene diisocyanate and 1-chlorobenzene-2,4-diisocyanate.

Additional diisocyantes useful in the substrate modifiers include unsaturated ester diisocyanates including bis(2-isocyanatoethyl)-fumarate, bis(7-isocyanatoheptyl) itaconate, bis(4-isocyanato-2-butenyl) glutaconate, 4-isocyanato-2-butenyl-3-isocyanatopropyl fumarate, bis(4-cyclohexyl-6-isocyanatohexyl) fumarate, bis(5-isocyanatocycloheptylmethyl) maleate, and the like.

Additional useful diisocyanates include carbonate diisocyanates such as bis(2-isocyanatoethyl) carbonate, bis(7-isocyanatoheptyl) carbonate, bis(10-isocyanatodedcyl) carbonate, bis(4,4-dimethyl-6-isocyanatohexyl) carbonate, 5-isocyanatopentyl-6-isocyanatohexyl carbonate, 4-isocyanato-2-butenyl-3-isocyanatopropyl carbonate, bis(4-cyclohexyl-6-isocyanatohexyl) carbonate, and the like. Other examples include 1,3-bis-(gamma-isocyanatopropoxy)-2-methyl-2-propylpropane, beta-isocyanatoethyl-6-isocyanatocaproate, beta-isocyanatoethyl-3-isocyanatoproprionate), 1,6-di(6-isocyanatocaprolyloxyl)hexane and the like, 2-isocyanatoethyl-6-isocyanato-hexanoate, 4-isocyanato-butyl-5-isocyanatopentanoate, and the like, bis(4-isocyanatocyclohexyl)-methane, nonamethylenediisocyanate, bis(6-isocyanato-2-ethyl-hexyl)ethylmethane, 2,4,4-(2,2,4)trimethylhexane-1,6-diisocyanate, 2,2,4-trimethylhexane-1,6-diisocyanate, 3-isocyanatomethyl-3,5,5-trimethylcyclohexylisocyanate and similar compounds. Useful commercial diisocyanates include "DDI diisocyanate" offered in commerce by the Chemical Division of General Mills, Inc., Kankakee, Illinois as described in their Bulletin 8-65 dated Sept. 29, 1965.

The diisocyanates used in preparation of the substrate modifiers and in preparation of the primer coatings may be prepared by methods known in the art. Detailed methods of preparation of most of these diisocyanates, may be found in such U.S. Patents as Nos. 3,427,346; 3,275,679; 3,162,664; 3,280,184; 3,267,122, and others. The preferred urethane elastomer used as a substrate modifier in the present invention comprises the residue of the reaction of β-hydroxyethyl methacrylate, 1,3-butylene glycol, bis(4-isocyanatocyclohexylmethane), and an ethylene glycol propylene glycol copolymer ester of adipic acid. This elastomer is also useful as the primer coating for the substrate which is the subject of the present invention.

As pointed out in Niederhauser et al. the elastomers which modify the preferred substrate may be intermixed with the rigid thermoplastic by any known method. For example, they may be physically mixed with thermoplastic resin to be later melted and molded into useful shapes. The urethane elastomers may be melted into and with the thermoplastic polymer and extruded in the form of molding compounds to be molded into useful shapes at a later time. A preferred embodiment of Niederhauser et al. is the incorporation of the urethane elastomers in the monomers used to prepare the rigid thermoplastics and polymerizing the monomers with the urethane elastomers intermixed therein. The urethane elastomers form stable dispersions or solutions in the monomer mix to provide uniform, consistent properties.

The urethane elastomer which modifies the rigid polymers which comprise the preferred substrates of the present invention may contain additional constituents which provide a refractive index close to that of the rigid polymer to provide a high degree of clarity. These additional constituents include polyols. The elastomers used to modify the substrate polymers may also contain sites for grafting between the elastomer and the rigid polymer. Preferred urethane elastomers are of an equivalency of at least 4,000 where equivalency is the molecular weight divided by isocyanate functionality as determined by isocyanate titration. There is no known upper limit to the equivalency of useful urethane elastomers but the more preferred molecular weight range is 4,000 – 50,000 the equivalent weight range most preferred is 10,000 to 30,000. It is preferred that the glass temperature $T_g$ be below 25°C. and more preferred to be below 0°C. A urethane elastomer modified polymer with a deformation temperature of 55 or higher under load (ASTMD - 648) is preferred.

The present invention includes high impact resistant thermoplastic substrates coated with the polyurethane elastomers and finally overcoated or painted with a protective or coloring resin film, preferably an acrylic paint film. These films are formed by coating the polyurethane elastomer primer coat with a stable pigment-containing solution polymer by dipping, roller coating, application by brushes, padding, spray coating, curtain coating, silk screen processes or the like.

Polymers used in the preferred acrylic paint films used in this invention include the polymers and copolymers of acrylic acid, methacrylic acids and itaconic acid, and polymers and copolymers of esters and amides of the same acids. Thus suitable polymers include polymers and copolymers of normal and branch-chained alkyl esters, such as methyl acrylate, ethyl acrylate, butyl acrylate, 2-ethylhexyl acrylate, methyl methacrylate, ethyl methacrylate, butyl methacrylate, hexyl methacrylate, stearyl methacrylate, etc.; esters of olefinic alcohols, e.g., allyl acrylate, 2-methylallyl acrylate, 2-butenyl acrylate, 1-methylallyl acrylate, 2-chloroallyl acrylate, etc.; amino esters such as 2-(dimethylamino)ethyl acrylate, 2-(diethylamino)ethyl acrylate, 3-(diethylamino)propyl methacrylate, etc.; esters of ether alcohols such as 2-methoxyethyl acrylate, 2-ethoxyethyl methacrylate, 2-isopropoxyethyl acrylate, etc.; cycloalkyl esters such as cyclohexyl acrylate, 3-methylcyclohexyl methacrylate, etc.; esters of halogenated alcohols such as 2-bromo-ethyl acrylate, 3-chloropropyl acrylate, etc.; nitroalkyl esters such as 2-nitroethyl acrylate, 2-nitropropyl acrylate, etc.; and glycol acrylates such as ethylene glycol acrylate or methacrylate both the amides, such as acrylamide and methacrylamide, mono- and di-esters, propylene glycol acrylates, etc.; the preferred acrylic resins are the polymers and copolymers of ethyl acrylate, butyl acrylate, methyl methacrylate, methacrylic acid and acrylamide.

The acrylic paint compositions preferred in this invention are dissolved in a conventional solvent system, wellknown in the art. These systems include toluene, methyl ethyl ketone, the monomethyl ester of ethylene glycol and other conventional solvents used in acrylic solvent paints.

The stable pigment containing solution polymer paint compositions may include other additives such as binders, foam control agents, dulling agents, etc. conventionally found in pigment compositions.

Pigments suitable for use are those conventionally used in sign paint compositions and for other purposes for example disperse and casein band pigments. The term "pigment" is here used to cover powder or powdered substances which are mixed with liquids to form paints, enamels and other coating compositions or the like, and which are insoluble in the liquids, and which provide covering, hiding, filling, delustering, dulling and/or coloring action.

Suitable pigments include, but are not limited to, white lead, zinc oxide, titanium pigments, lithopone, other zinc sulfide pigments, barium sulfate, calcium carbonate, silica, talc, mica, and clays, such as china clay. Pigment pastes normally comprise one or more of these or equivalent pigments. There may be added one or more insoluble inorganic or organic colors, such as iron oxide, carbon black, cadmium sulfide, toluidine red, lithol toner, chrome orange, chrome yellow, Hansa yellow, chrome green, phthalocyanine green, phthalocyanine blue, etc.

It might be noted here that some sign paints, e.g. polyvinylchloride-acetate copolymer paint compositions which contain plasticizers when painted onto high impact resistant substrates without the use of the urethane primer coatings of the present invention, do not embrittle and are effective in retaining the impact resistance of the substrate. However upon thermoforming these paints do become brittle and the impact strength of the substrate is lost. The compositions of the present invention retain high impact resistance even when thermo-formed.

The following examples illustrate the invention. All percentages are by weight unless otherwise indicated.

EXAMPLE 1

This example illustrates the preparation of a urethane elastomer which can be used as a modifier to produce the substrate material and which can also be used as the coating elastomer for the present invention.

The following materials are used to prepare the elastomer:

| Materials | Specific gravity | Equivalent weight [1] | Equivalent ratio [2] | Parts by weight |
|---|---|---|---|---|
| Bis(4-isocyanatocyclohexylmethane) | 1.07 | 131.6 | 2.438 | 320.8 |
| Poly(ethylene glycol/propylene glycol adipate) | 1.2 | 967 | 1.00 | 967.0 |
| 1,3-butylene glycol | 1.00 | 45.05 | 1.30 | 58.6 |
| β-hydroxyethyl methacrylate | 1.0 | 130 | [3] 0.138 | 120.0 |

[1] Equvalent weight is the molecular weight divided by the reactive functionality.
[2] Equivalent ratio is the number of moles divided by the reactive functionality.
[3] Plus excess.

Suitable glassware is dried at 100°C. in a vacuum overnight. Water contamination from the equipment, the atmosphere and the reactants, is carefully avoided. The bis(4-isocyanatocyclohexylmethane) and 0.6 gr. of stannous octoate are placed in a dried 5-liter, 3-necked round-bottomed flask provided with a stirrer, reflux condenser and topped with a drying tube. The flask is also provided with a funnel with a pressure equalizer. Using an external oil bath, the temperature is adjusted to 50°C. The poly(ethylene glycol/propylene glycol adipate) and the 1,3-butylene glycol are dissolved in 261 ml. of dried methyl methacrylate. The resulting solution is added dropwise to the flask over a period of 4 hours with moderate stirring. The reaction is continued for 5 to 9 hours after which an additional aliquot of 750 ml. of dried methyl methacrylate is added. The reaction is completed as determined by a constant equivalent weight by isocyanate titration after 12 to 15 hours. Exotherm during the addition of the polyester and glycol is easily controlled by periodic removal of the oil bath. Equivalent weight by isocyanate titration is 6,700 units. The β-hydroxyethyl methacrylate and 0.6 gr. stannous octoate are added and the reaction is continued for 3½ hours at 50°C. The solids content at the end of the reaction is 55.8 percent. A 35 percent solution of the elastomer in methyl methacrylate exhibits a viscosity of Z3 by the Gardner Holdt method.

EXAMPLE 2

The following example illustrates preparation of the preferred substrate material of the present invention.

The urethane elastomer solution in methyl methacrylate prepared in Example 1 (58.8 solids) is separated into aliquots which are mixed with additional methyl methacrylate such that the amount of the urethane elastomer is about 17 percent by weight. Catalyst in the amount of 0.03 percent of a solution of 25 percent acetyl peroxide in dimethyl phthalate is added. The mixes are placed into cells prepared from glass plates on which an appropriate release agent is applied. Spacers and dams are affixed to the cells to prevent leaking. The filled glass plate molds are cured on a temperature schedule of from 60°C. to 120°C. The cured castings are removed from the molds. These castings exhibit excellent impact strength, glasslike clarity and good solvent craze resistance.

EXAMPLE 3

This example illustrates the compositions of the present invention and their preparation.

In the following example, primers are applied by a sprayer which is a Jet-Pak Sprayer, Sprayon Products, Inc., Bedford Heights, Ohio; Anaheim, California, a Freon[R] powered aerosol spray unit which delivers a dry coating thickness of about 0.5 to 0.8 mil. The primers are applied to test panels, 4 inches × 6 inches of the high impact methyl methacrylate sheet of Example 2. The test panels are 0.125 inch in thickness. The elastomers are fully reacted, solvent-drying polyurethanes based on aliphatic diisocyanates coupled with polyester segments from the condensation of 1,4-butanediol and adipic acid. The elastomer designated "A" is supplied as a 35 percent solids solution in a solvent blend of 45 parts N,N'-dimethyl formamide and 55 parts xylene and elastomer B is a 35 percent solids solution in 65 parts N,N'-dimethyl formamide and 55 parts xylene. The solutions are cut to a suitable spray viscosity by diluting one part of the elastomer solution with 2 parts of a 2/1 solvent blend of xylene and ethylene glycol monoethyl ether acetate. The resulting solution of elastomer A has a viscosity of 22 seconds and the solution of elastomer B has a viscosity of 18 seconds (No. 4 Ford Cup).

The primers are applied to the test panel and are air dried for a period of about 1½ hours. The panels are then painted with an acrylic solution polymer paint (Grip-Flex White acrylic sign paint supplied by Wyandotte Paint Products Company Inc.). The painted panels are air dried for 30 minutes then heated at 180°C. to simulate thermoforming conditions (at the same time these heating conditions insure complete volatilization of lacquer solvents so that impact values are not inflated by the plasticizing action of solvents). The painted and primed structures are cooled to room temperature, and the impact resistance values of the panels are determined by a variable height impact tester (VHIT) from Gardner Laboratories, Bethesda, Maryland. Impact resistance results are evaluated by the "Staircase Method of Sensitivity Testing," NAVORD Report 65–46, Method 4. The values are determined by impact on the reverse side of the sample (unpainted side). A 50 percent failure value was determined from greater than 10 impact hits. The microknife adhesion values are determined as described supra in this specification. All four of the following samples are heated at 180°C. (356°F.) for 15 minutes before testing. The following results are obtained in this series:

| Sample | Treatment | (VHIT) inch-lb. | Microknife Adhesion (1/A) |
|---|---|---|---|
| I | Unprimed, unpainted (control) | 58 | — |
| II | Primed (elastomer A) + painted | 145 | 0.208 |
| III | Primed (elastomer B) + painted | 145 | 0.247 |
| IV | Painted only | 10 | 0.303 |

EXAMPLE 5

In this example the primer is a polyurethane elastomer lacquer based on aromatic diisocyanate coupled polyester segments. The elastomer is supplied as 100 percent solids in crumb form by the Ruco Division of Hooker Chemical Co. (designated Rucothane P-49 polyurethane elastomer).

A 20 weight percent master solution of the polyurethane in cyclohexanone is diluted with a xylene/ethylene glycol monoethyl ether acetate mixture to give a spray lacquer of 19 seconds viscosity (No. 4 Ford Cup). The final spray solution has the following composition:

| | |
|---|---|
| polyurethane elastomer | 6.7 parts |
| cyclohexanone | 26.7 parts |
| xylene | 44.5 parts |
| ethylene glycol mono-ethyl ether acetate | 22.1 parts |

Half of a panel of the methyl methacrylate high impact resistant sheet of Example 2 is primed with the spray solution to a thickness of about 0.30 mil (after drying). The primed panel is dried for one hour at 140°F., is allowed to cool and the primed section is covered with a Grip-Flex White acrylic sign paint (Wyandotte Paint Products Company, Inc.) from a self-contained aerosol and is dried at 140°F. for 1 hour.

Impact resistance is determined on both the primed and painted area and then on the unprimed and unpainted area by the Gardner Variable Height Impact Tester (VHIT) and a microknife adhesion value is determined for the painted portion. A $H_f$ value of 155 inch-lbs. is determined by the variable high impact test on the unprimed and unpainted area and a $H_f$ value of 160 inch-lbs. is determined for the painted area which has a microknife adhesion value (1/A) of 0.218.

This example illustrates the use of aromatic diisocyanate based polyurethanes for the primer coatings of the present invention. This example also illustrates that the polyurethane primers of the present invention substantially maintain the high impact resistance of the uncoated sheet substrate.

EXAMPLE 6

In this example, the primer is the polyurethane elastomer lacquer prepared in Example 1 and used for modifying the sheet substrate of Example 2. In the present example, the elastomer is used both to modify the sheet substrate and as a primer coat for a non-embrittling coating composition.

A solution of the elastomer of Example 1 is made up to spray viscosity with a xylene/ethylene glycol mono-ethyl ether acetate mixture. The final spray solution has a viscosity of 27 seconds (No. 4 Ford Cup at 25°C.) and had the following composition:

| | |
|---|---|
| polyurethane elastomer | 12.5 parts |
| methyl methacrylate monomer | 12.5 parts |
| xylene | 46.5 parts |
| ethylene glycol monoethyl ether acetate | 28.5 parts |

A panel of the high impact sheet of Example 2 (10 inches × 4 inches × 0.120 inches) is half sprayed with the elastomer primer solution and allowed to dry for 3½hours at 140°F. The panel is cooled and the primer area sprayed with Grip-Flex White paint from a self-contained aerosol (FR 2-152 from Wyandotte Paint Products Company, Inc.) and allowed to dry at 140°F. for 16 hours. The impact resistance and microknife adhesion values of the primed and painted area of the sheet are evaluated and the impact resistance is compared with the impact resistance of the unprimed and unpainted area:

| | $H_f$ (VHIT) inch-lb. | Microknife Adhesion (1/A) |
|---|---|---|
| Unprimed, unpainted area | 140 | — |
| Primed and painted | 140-150 | 0.198 |

EXAMPLE 7

In this example, two samples (indicated Sample I and Sample II respectively in this example) of the high impact resistant sheet of Example 2 are primed respectively with the polyurethane elastomers of Example 3 and a third sample (indicated Sample III) is primed with a fully reacted, solvent drying urethane elastomer. The elastomer is supplied as a 35 percent solids solution in a solvent blend of N,N'-dimethyl formamide, xylene and tetrahydrofuran.

All three of the polyurethane elastomers are diluted at a 1 to 2 solvent ratio with a 2/1 xylene/ethylene glycol monoethyl ether acetate solvent blend. The three resulting solutions have the following viscosity (No. 4 Ford Cup):

| Sample | Viscosity |
|---|---|
| I | 18 seconds |
| II | 18 seconds |
| III | 17 seconds | where Sample I and Sample II are respectively the same polyurethane elastomers of Example 3, Samples II and III, and Sample III here is the polyurethane elastomer in the solvent blend of N,N'-dimethyl formamide, xylene and tetrahydrofuran.

Panels of the high impact resistant sheet of Example 2 are sprayed with the primers and allowed to air dry for 1½hours. The dried panels are then painted with Grip-Flex White. Each sample is heated for 15 minutes at 180°C. The following gives impact resistance values for the panels as well as for an unprimed and unpainted control panel IV and for a painted sample V.

| Sample | Treatment | $H_f$ (VHIT) inch-lb. | Microknife Adhesion (1/A) |
|---|---|---|---|
| I | primed and painted | 110-120 | 0.226 |
| II | primed and painted | 100-110 | 0.214 |
| III | primed and painted | 10 | 0.300 |
| IV | unprimed and unpainted | 95-110 | — |
| V | painted only | 10 | 0.303 |

This example illustrates compositions characterized by microknife adhesion values outside of the suitable range of the present invention which compositions do not retain the high impact resistance of the sheet substrate.

EXAMPLES 8 and 9

The following examples illustrate the present invention as applied to two different substrate compositions. The substrate designated A in the following table is produced from a tough, transparent molding powder having the following composition: 57 parts of a (96:4) methyl methacrylate:ethylacrylate copolymer containing a toner and an ultraviolet stabilizer and 43 parts of a polymer of approximately 56 parts butyl acrylate, 13 parts styrene, 28 parts methyl methacrylate and 3 parts of methyl acrylate, allyl methacrylate, and 1,3-butylene diacrylate. Substrate B is a modified cellulose acetate-butyrate sheet.

The primer compositions designated elastomer A and elastomer B (in Example 3) are applied to test panels of substrate A and substrate B. The panels are allowed to air dry for 1½ hours. The panels are then painted with the acrylic solution polymer paint of Example 3 and are dried at 140° F. for 1 hour. Impact values are then determined. The table gives impact resistance values for these panels as well as for the control panels indicated.

| Sample | Treatment | $H_f$ (VHIT) inch-lb. |
|---|---|---|
| Substrate A | Unprimed, unpainted (control) | 86 |
| Substrate A | Primed (elastomer A) + painted | 145 |
| Substrate A | Primed (elastomer B) + painted | 145 |
| Substrate A | Painted only | <20 |
| * Substrate B | Unprimed, unpainted (control) | >160 |
| * Substrate B | Primed (elastomer A) + painted | 59 |
| * Substrate B | Primed (elastomer B) + painted | 68 |
| * Substrate B | Painted only | <50 |

*Non failure of the substrate B test panels are generally recognized by hairline cracks radiating out from the center of the stress crazed areas.

What is claimed is:

1. An article of manufacture comprising a high impact resistant thermoplastic polymer substrate comprising the residue of the reaction of a block of thermoplastic polymer derived from esters of methacrylic acid joined to blocks of urethane modifier comprising the residue of the reaction of a polyhydroxy-containing polyester, an aliphatic or alicyclic diisocyanate and a glycol, the modifier terminated with a functional monomer capable of ethylenic polymerization grafting with the polymer derived from the esters of methacrylic acid, said substrate coated with a polyurethane elastomer comprising the residue of the reaction of a diisocyanate and a polyhydroxy compound, said article characterized by improved resistance to crack propagation into the substrate from brittleness of paint coatings when said article has been painted.

2. The article of manufacture of claim 1 in which the block polymer comprises a block of rigid thermoplastic methacrylic polymer which is the addition product of (a) at least 55 percent alkyl, cycloalkyl or aryl esters of methacrylic acid where the alkyl esters form a homopolymer with a glass transition temperature, Tg, greater than 90° C; (b) 0 to 45 percent of other ethylenically unsaturated monomers capable of polymerizing with the alkyl methacrylate, and (c) 0 to 5 percent ethylenically unsaturated monomers chosen from the group consisting of highly polar monomers and polyethylenically unsaturated monomer.

3. The article of manufacture of claim 1 in which the urethane modifier comprises the residue of the reaction of β-hydroxyethyl methacrylate, 1,3-butylene glycol, bis(4-isocyanatocyclohexyl) methane and an ethylene glycol/propylene glycol copolymer ester of adipic acid.

4. The article of manufacture of claim 1 in which the polyurethane elastomer coating exhibits, on the substrate, microknife adhesion values of between 0.10 and up to 0.28.

5. The article of manufacture of claim 4 in which the polyurethane elastomer coating comprises the reaction product of a polyhydroxy-containing polyester or polyether and an aliphatic or alicyclic diisocyanate.

6. The article of manufacture of claim 1 in which the polyurethane elastomer coating comprises the reaction product of a polyhydroxy containing polyester or polyether and an aliphatic or alicyclic diisocyanate which product exhibits, on the substrate, microknife adhesion values of between 0.10 and up to 0.28.

7. The article of manufacture of claim 6 in which the polyurethane elastomer coating comprises the residue of the reaction of β-hydroxyethyl methacrylate, 1,3-butylene glycol, bis(4-isocyanatocyclohexyl) methane and an ethylene propylene glycol copolymer ester of adipic acid.

8. The article of manufacture of claim 1 overcoated with an acrylic paint film.

* * * * *